(12) United States Patent
Han et al.

(10) Patent No.: US 11,381,366 B2
(45) Date of Patent: Jul. 5, 2022

(54) WIRELESS COMMUNICATION DEVICES FOR TRANSMITTING DATA USING SPATIAL REUSE AND DATA COMMUNICATION METHODS USING THE SAME

(71) Applicant: Samsung Electronics Co., Ltd., Suwon-si (KR)

(72) Inventors: Jong-hun Han, Gwacheon-si (KR); Young-wook Son, Seoul (KR); Sung-hyun Choi, Seoul (KR); Seong-won Kim, Seoul (KR); Kang-hyun Lee, Seoul (KR)

(73) Assignees: SAMSUNG ELECTRONICS CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 164 days.

(21) Appl. No.: 16/460,386

(22) Filed: Jul. 2, 2019

(65) Prior Publication Data
US 2020/0162223 A1    May 21, 2020

(30) Foreign Application Priority Data
Nov. 16, 2018    (KR) .................. 10-2018-0141957

(51) Int. Cl.
| | |
|---|---|
| *H04L 5/00* | (2006.01) |
| *H04W 24/08* | (2009.01) |
| *H04W 72/04* | (2009.01) |
| *H04W 56/00* | (2009.01) |

(52) U.S. Cl.
CPC .......... *H04L 5/0055* (2013.01); *H04W 24/08* (2013.01); *H04W 72/0446* (2013.01); *H04W 56/001* (2013.01)

(58) Field of Classification Search
CPC  H04L 5/0055; H04W 24/08; H04W 72/0446; H04W 56/001
See application file for complete search history.

(56) References Cited

U.S. PATENT DOCUMENTS

| | | | |
|---|---|---|---|
| 8,666,319 | B2 | 3/2014 | Kloper et al. |
| 9,521,587 | B2 | 12/2016 | Krzymien et al. |
| 9,820,162 | B2 | 11/2017 | Wang et al. |
| 9,924,540 | B2 | 3/2018 | Huang et al. |
| 9,979,528 | B2 | 5/2018 | Park et al. |
| 10,039,115 | B2 | 7/2018 | Cariou et al. |
| 2017/0071009 | A1* | 3/2017 | Huang ............. H04W 74/0808 |
| 2017/0086206 | A1 | 3/2017 | Wang |
| 2017/0325254 | A1 | 11/2017 | Zhou et al. |

(Continued)

*Primary Examiner* — Luat Phung
(74) *Attorney, Agent, or Firm* — Harness, Dickey & Pierce, P.L.C.

(57) ABSTRACT

Provided is a wireless communication device including at least one processor configured to transmit a plurality of test signals generated based on different transmission factors to a reception device, and transmit first data to the reception device based on a transmission factor of a first test signal among the plurality of test signals in response to determining a first acknowledgement signal has been received, the first acknowledgement signal corresponding to the first test signal, the transmission of the first data being via a wireless data channel while second data is contemporaneously transmitted via the wireless data channel by another device.

20 Claims, 14 Drawing Sheets

(56) References Cited

U.S. PATENT DOCUMENTS

| | | | |
|---|---|---|---|
| 2018/0027573 A1* | 1/2018 | Cariou | H04W 72/085 370/329 |
| 2018/0220456 A1* | 8/2018 | Kim | H04W 74/0808 |
| 2019/0124695 A1* | 4/2019 | Seok | H04W 72/0473 |
| 2019/0208423 A1* | 7/2019 | Cherian | H04W 16/10 |
| 2019/0313328 A1* | 10/2019 | Ma | H04B 17/345 |

* cited by examiner

| | Tx Power | BPS |
|---|---|---|
| TF1 | P1 | n1 |
| TF2 | P2 | n2 |
| TF3 | P3 | n3 |
| TF4 | P4 | n4 |

Weak ↓ Strong $$\begin{pmatrix} P1 \leq P2 \leq P3 \leq P4 \\ n1 \geq n2 \geq n3 \geq n4 \end{pmatrix}$$

WIRELESS COMMUNICATION DEVICES FOR TRANSMITTING DATA USING SPATIAL REUSE AND DATA COMMUNICATION METHODS USING THE SAME

CROSS-REFERENCE TO RELATED PATENT APPLICATION

This application claims the benefit of Korean Patent Application No. 10-2018-0141957, filed on Nov. 16, 2018, in the Korean Intellectual Property Office, the disclosure of which is incorporated herein in its entirety by reference.

BACKGROUND

The inventive concepts relate to wireless communication devices and data communication methods using the wireless communication devices, and more particularly, to wireless communication devices for transmitting data using a spatial reuse (SR) and data communication methods using the wireless communication devices.

Wireless Local Area Networks (WLAN) are configured based on the Institute of Electrical and Electronics Engineers IEEE 802.11 standard and used to cover shadow areas, where wireless communication services are limited, at low cost. WLANs are configured to expand a service area using an access point (AP). Therefore, in a WLAN, a wireless device selects one AP to use a communication service and be connected to the selected AP. For example, in the WLAN, a wireless device provides an AP selection and a connection method based on a BSS (Basic Service Set) load.

The number of installed Wi-Fi wireless routers (APs) is gradually increasing per unit area in order to supplement the increased wireless demand due to the spread of wireless terminals such as smart phones and pads. The rapidly increasing number of terminals and requests for access to wireless networks forms an overlapped basic service sets (OBSS) environment in which a plurality of terminals and APs overlappingly coexist in an area. In this OBSS environment, terminal and AP densities are increasing over time.

SUMMARY

The inventive concepts provides a wireless communication device for adaptively controlling a transmission factor for spatial reuse (SR) data and a data communication method using the wireless communication device.

According to an aspect of the inventive concepts, there is provided a wireless communication device including a memory storing computer-readable instructions and at least one processor. The at least one processor is configured to execute the computer-readable instruction to transmit a plurality of test signals generated based on different transmission factors to a reception device, and transmit first data to the reception device based on a transmission factor of a first test signal among the plurality of test signals in response to determining a first acknowledgement signal has been received, the first acknowledgement signal corresponding to the first test signal, the transmission of the first data being via a wireless data channel while second data is contemporaneously transmitted via the wireless data channel by another device.

According to an aspect of the inventive concepts, there is provided a data communication method of transmitting first data using spatial reuse (SR) in which the first data is transmitted via a wireless data channel while second data is contemporaneously transmitted via the wireless data channel by another device. The data communication method includes transmitting a first test signal having a first transmission factor; transmitting a second test signal in response to determining an acknowledgement signal corresponding to the first test signal has not been received, the second test signal having a second transmission factor different from the first transmission factor; and transmitting the first data using the second transmission factor in response to determining an acknowledgment signal corresponding to the second test signal has been received.

According to an aspect of the inventive concepts, there is provided a data communication method of transmitting first data using spatial reuse (SR) in which the first data is transmitted via a wireless data channel while second data is contemporaneously transmitted via the wireless data channel by another device, the first data corresponding to a first transmission period for transmitting the first data. The data communication method includes obtaining a second transmission period of the second data from a header of the second data; adjusting the first transmission period based on the second transmission period to generate an adjusted first transmission period; and transmitting the first data based on the adjusted first transmission period.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
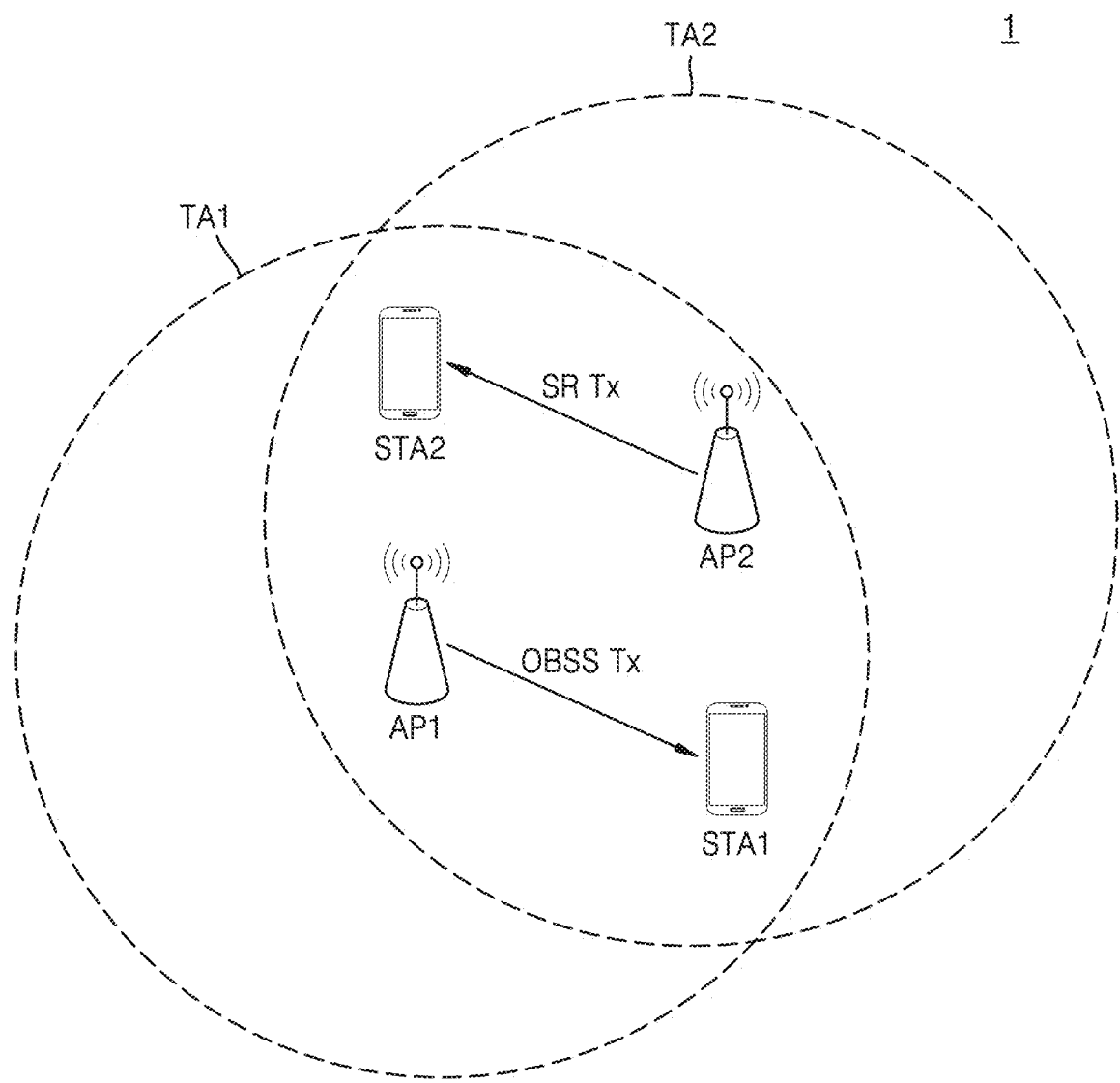
FIG. 1 is a diagram illustrating a wireless communication system in which spatial reuse (SR) communication is performed according to an example embodiment of the inventive concepts.

FIG. 1 is a diagram illustrating a wireless communication system in which spatial reuse (SR) communication is performed according to an example embodiment of the inventive concepts.

When two or more signal transmissions are contemporaneously performed at a specific time, a medium access control (MAC) protocol based on IEEE 802.11 regards the two or more signal transmissions as a collision. Therefore, different stations and access points (APs), using the same channel or a similar channel, occupy and use a channel through mutual competition.

In an overlapped basic service sets (OBSS) environment, the number of terminals and APs using the same channel or a similar channel as described above is large, and thus a probability of occurrence of the collision is high. A hidden node challenge in such an OBSS environment results from terminals outside a sensing coverage of each other failing to detect each other and attempt transmission, causing degradation of received signals. Also, an exposed node challenge in such an OBSS environment results from too many terminals present in the sensing coverage rarely attempting transmission causing degradation of the overall performance of a network.

Therefore, in an environment in which different WLAN networks (BSSs) using the same channel overlappingly (e.g., contemporaneously and/or over a similar area or the same area) exist (e.g., the OBSS environment), IEEE 802.11 standardization has been carried out by attempting to mitigate inter-BSS interference and improve performance by changing parameters of each BSS, for example, sensing power, channel, transmission power, a beam forming direction, etc.

Referring to FIG. 1, the wireless communication system 1 may be a system including a plurality of communication devices that communicate with each other using WiFi (Wireless Fidelity) and/or other WLAN communication technologies based on the IEEE 802.11 specification, and may include, for example, a first AP AP1, a second AP AP2, a first station STA1, and a second station STA2.

Each of the first AP AP1 and the second AP AP2 is an access node of the WLAN, and may be an entity that provides a connection to a distribution system (DS) over a wired or wireless medium to an associated station. Each of the first AP1 and the second AP 2 may be referred to as a router, a central controller, a router, a gateway, a base station (BS), a node-B, a base transceiver system (BTS), a site controller and/or the like. The first AP AP1 and the second AP AP2 may communicate with stations using Wi-Fi and may each have a determined transmission range according to respective transmission capability. The first transmission area TA1 may indicate a range where the first AP1 is able to communicate with stations using Wi-Fi. The second transmission area TA2 may indicate a range where the second AP2 is able to communicate with stations using Wi-Fi.

A station means an entity including a medium access control (MAC) and a physical layer interface for a wireless medium, and may include an access point (AP) and a non-access point station (non-AP station). For convenience of description, the terminology of the station herein may be limited to the non-AP station. The station is a portable terminal operated by a user and may be referred to as a terminal, a wireless transmit/receive unit (WTRU), a user equipment (UE), a mobile station (MS), a mobile terminal, a mobile subscriber unit, a mobile device and/or the like.

In the example of FIG. 1, the first station STA1 and the second station STA2 may be included in both a first transmission area TA1 of the first AP AP1 and a second transmission area TA2 of the second AP AP2. The first AP1 may perform OBSS communication OBSS Tx with the first station STA1. The second AP 2 may perform spatial reuse (SR) communication SR Tx with the second station STA2. According to the IEEE 802.11 protocol, in a situation where two or more APs AP1 and AP2 coexist (e.g., a situation where the first transmission area TA1 by the first AP AP1 and the second transmission area TA2 by the second AP AP2 at least partially overlap), when one AP (e.g., AP1) is performing OBSS communication OBSS Tx, another AP (e.g., AP2) may perform SR transmission SR Tx having reduced transmission power, and thus data transmission may be possible by two APs even when transmission ranges overlap.

In the present specification, data transmitted based on the OBSS communication OBSS Tx like data output from the first AP AP1 to the first station STA1 is referred to as OBSS data, and data transmitted based on the SR communication SR Tx like data output from the second AP AP2 to the station STA2 is referred to as SR data.

According to an example embodiment of the inventive concepts, the second AP AP2 may adaptively determine an optimal or an improved transmission factor using at least one test signal prior to performing SR communication SR Tx, and perform SR communication SR Tx using the determined transmission factor. This will be described in detail later with reference to FIGS. 3 to 7.

According to an example embodiment of the inventive concepts, the second AP AP2 may determine a transmission period of SR communication SR Tx for transmitting the SR data based on a transmission period of OBSS communication OBSS Tx and perform SR communication SR Tx using the determined transmission period. This will be described later in detail with reference to FIGS. 8A to 12.

According to an example embodiment of the inventive concepts, the second AP AP2 may delay a block acknowledgment signal for the SR data using a delayed acknowledgment policy signal, and adaptively determine a transmission factor according to whether the second AP AP2 receives a block acknowledgment signal for the OBSS data of the first AP AP1. This will be described in detail later with reference to FIGS. 13 to 17.

In the present specification, down-link communication in which an AP becomes a transmission subject and a station becomes a reception subject is described but this is merely an example. It should be understood that the technical idea of the inventive concepts may also be applied to up-link communication in which a station becomes a transmission subject and an AP becomes a reception subject.

Figure 2:
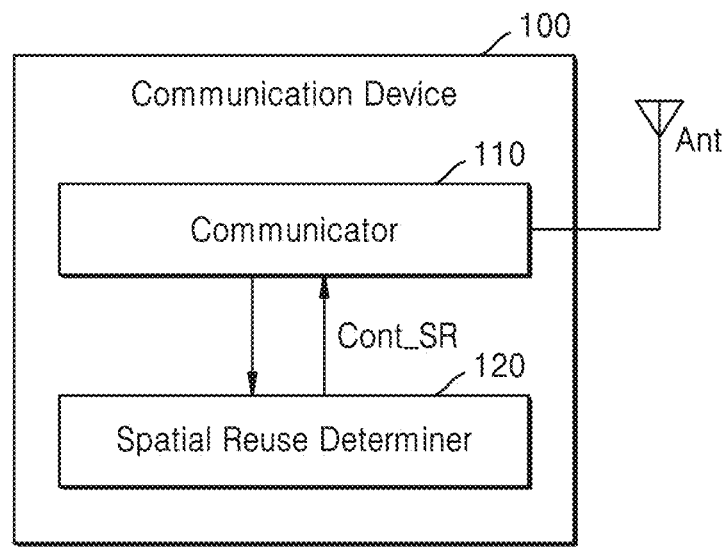
FIG. 2 is a block diagram illustrating a communication device according to an example embodiment of the inventive concepts.

FIG. 2 is a block diagram illustrating a communication device 100 according to an example embodiment of the inventive concepts.

Referring to FIG. 2, the communication device 100 may represent an AP (e.g., AP1, AP2 in FIG. 1) and/or a station (e.g., STA1, STA2) described in FIG. 1 above. The communication device 100 may communicate with another communication device via a WLAN (e.g., Wi-Fi). The communication device 100 may include a communicator 110 and a SR determiner 120. The communicator 110 or the SR determiner 120 may be implemented as hardware including an electronic circuit, arithmetic logic, or the like, or may be implemented as software such as firmware. According to some example embodiments, operations described herein as being performed by any or all of the communicator 110, the SR determiner 120 and the communication device 100 may be performed by at least one processor executing program code that includes instructions corresponding to the operations. The instructions may be stored in a memory of the communication device 100. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multi-processor, an application-specific integrated circuit (ASIC), and a field programmable gate array (FPGA).

The communicator 110 may modulate a signal so as to communicate with another communication device, adjust a transmission factor of the signal, and/or output a transmission signal to the outside using a determined channel. To this end, the communicator 110 may include a modulator-demodulator (MODEM), a radio frequency integrated chip (RFIC), a power control unit, and/or the like, and may be connected to an antenna Ant. According to an example embodiment of the inventive concepts, the communicator 110 may perform SR communication with another communication device by adjusting a transmission factor for transmitting SR data based on an SR control signal Cont_SR. In the present specification, the transmission factor may indicate the nature of a signal that the communication device 100 may adjust to output data. Transmission power and the number of (e.g., quantity of) bits per symbol are examples of the transmission factor.

The SR determiner 120 may determine whether to use SR communication for transmitting data on the same channel or a similar channel as a wireless data channel being used by another communication device using color information of OBSS data of the other communication device received by the communicator 110. When SR communication is to be used, the SR determiner 120 may generate the SR control signal Cont_SR and output the generated SR control signal Cont_SR to the communicator 110. For example, the SR control signal Cont_SR may include at least one of transmission power information, information about the number of bits per symbol, information about the number of frames, and/or delay acknowledgment policy information.

According to an example embodiment of the inventive concepts, the SR determiner 120 may control the communicator 110 to output a plurality of test signals having different transmission factors to a reception device (e.g., STA2 of FIG. 1) and may output to the communicator 110 the SR control signal Cont_SR for adjusting the transmission factor for outputting the SR data using a transmission factor of a test signal that has received a response signal from the reception device.

According to an example embodiment of the inventive concepts, the SR determiner 120 may receive OBSS data from another transmission device (e.g., AP1 in FIG. 1) that performs OBSS communication through the communicator 110 (e.g., via the communicator 110). The SR determiner 120 may output to the communicator 110 the SR control signal Cont_SR for adjusting a transmission period for transmitting the SR data based on information about the transmission period of the OBSS data acquired from a header of the OBSS data. In an example embodiment, the SR determiner 120 may control the number (e.g., quantity) of a plurality of frames of the SR data by controlling the communicator 110, and thus an end time of the transmission period of the SR data may be similar or identical to an end time of the transmission period of the OBSS data.

According to an example embodiment of the inventive concepts, the SR determiner 120 may control the communicator 110 to output a delayed acknowledgment policy signal for delaying an acknowledgement signal for the SR data to the reception device (e.g., STA2 in FIG. 1). The SR determiner 120 may also control the communicator 110 to determine whether to receive a block acknowledgment signal corresponding to OBSS data transmitted from another transmission device (e.g., AP1 in FIG. 1) for performing OBSS communication. When the block acknowledgment signal corresponding to the OBSS data is not received, the SR determiner 120 may output the SR control signal Cont_SR having an adjusted transmission factor to the communicator 110.

Figure 3:
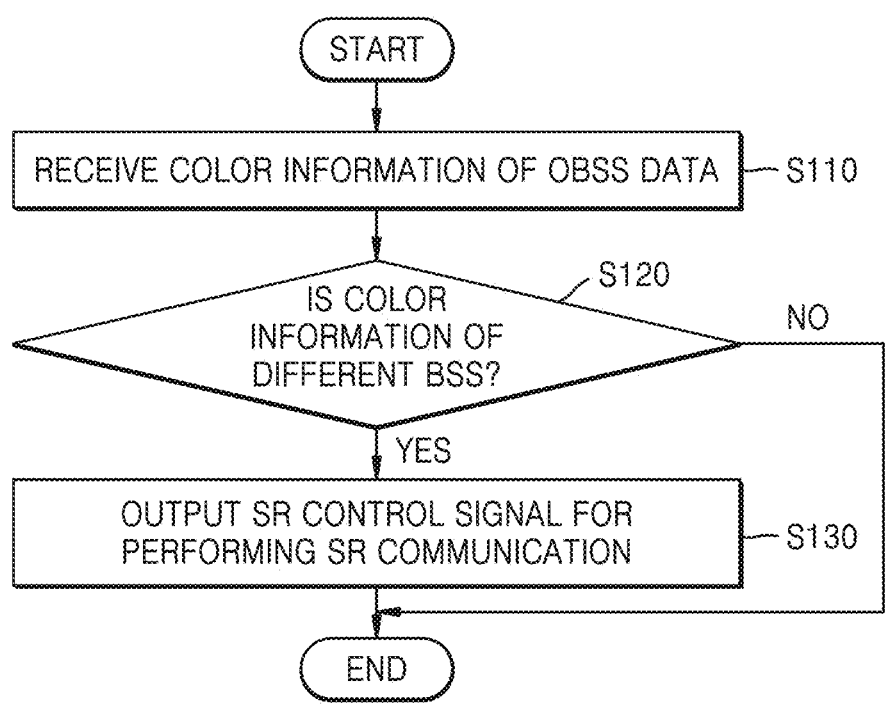
FIG. 3 is a flowchart illustrating a data communication method of determining whether to perform SR communication according to an example embodiment of the inventive concepts.

FIG. 3 is a flowchart illustrating a data communication method according to an example embodiment of the inventive concepts. In detail, FIG. 3 shows a method performed by the communication device 100 of determining whether to perform SR communication.

Referring to FIGS. 2 and 3, the SR determiner 120 may receive color information of OBSS data output from another transmission device through the communicator 110 (S110). For example, the communication device 100 may receive the color information by monitoring the channel in the OBSS environment. The SR determiner 120 may determine whether the OBSS data is data according to another basic service set (BSS) based on the color information (S120). For example, the SR determiner 120 included in an AP may determine whether a transmission subject of the OBSS data is different from the AP based on the color information.

When the color information is color information of data according to another BSS, the SR determiner 120 may output the SR control signal Cont_SR to the communicator 110 such that the communication device 100 may perform SR communication (S130). When the color information is not the color information of another transmission device, the communication device 100 may not perform SR communication.

Figure 4:
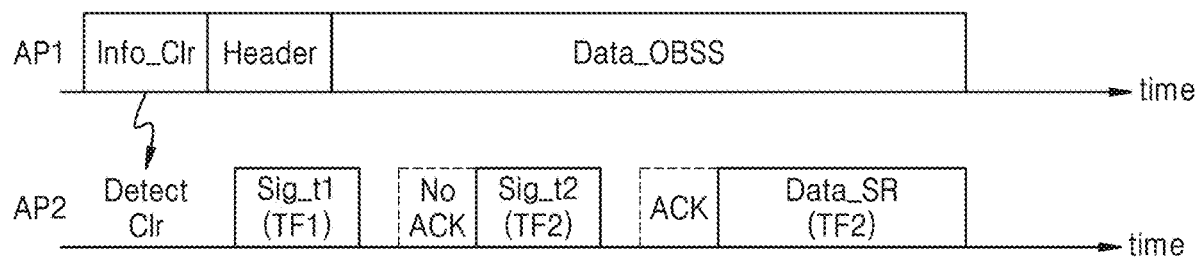
FIG. 4 is a diagram illustrating an operation of a communication device for adaptively determining a transmission factor using a test signal according to an example embodiment of the inventive concepts.

FIG. 4 is a diagram illustrating an operation of a communication device according to an example embodiment of the inventive concepts. In detail, FIG. 4 shows an operation performed by the communication device for adaptively determining a transmission factor through a plurality of test signals.

Referring to FIGS. 1 and 4, the second AP AP2 may receive color information Info_Clr of OBSS data Data_OBSS from the first AP AP1 and recognize the color information Info_Clr to determine whether to perform SR communication. When determining to perform SR communication, the second AP AP2 may output a first test signal Sig_t1 having a first transmission factor TF1. When an acknowledgment signal is not received corresponding to the first test signal Sig_t1 (No ACK), the second AP 2 may output a second test signal Sig_t2 having a second transmission factor TF2 different from the first transmission factor TF1. When acknowledgment signal is received corresponding to the second test signal Sig_t2 (ACK), the second AP AP2 may transmit SR data Data_SR using the second transmission factor TF2.

For convenience of description herein, the expression that a transmission factor is strong may mean that a probability that an accurate signal is delivered to a reception device is relatively high because intensity of transmission power (e.g., transmission power level) for outputting a transmission signal is relatively high, or the number of bits per symbol of the transmission signal is relatively small. Similarly, the expression that the transmission factor is weak may mean that the probability that an accurate signal is delivered to the reception device is relatively low because the intensity of transmission power for outputting the transmission signal is relatively low, or the number of bits per symbol of the transmission signal is relatively high.

In the example of FIG. 4, the first transmission factor TF1 for performing SR communication may be weaker than a transmission factor of OBSS data Data_OBSS output by the first AP AP1. The first test signal Sig_t1 may not be delivered to the reception device (e.g., STA2) because the first transmission factor TF1 of the first test signal Sig_t1 is much weaker than the transmission factor of the OBSS data Data_OBSS. Accordingly, the second AP AP2 may not receive an acknowledgment signal corresponding to the first test signal Sig_t1 from the reception device.

The second AP AP2 may output a second test signal Sig_t2 having a second transmission factor TF2 that is stronger than the first transmission factor TF1 (e.g., the intensity of transmission power is higher or the number of bits per symbol is lower). The second test signal Sig_t2 may be delivered to the reception device, and the second AP AP2 may receive the acknowledgement signal ACK corresponding to the second test signal Sig_t2 from the reception device, because the second test signal Sig_t2 has sufficient strength to be delivered to the reception device despite the OBSS data Data_OBSS.

That is, the fact that the second AP AP2 receives the acknowledgment signal corresponding to the second test signal Sig_t2 from the reception device may mean that the second transmission factor TF2 is a transmission factor having intensity sufficient to be delivered to the reception device despite the presence the OBSS data Data_OBSS in the channel. Thus, according to an example embodiment of the inventive concepts, the second AP AP2 may output the SR data Data_SR using the second transmission factor TF2 after confirming through the test signal that the second transmission factor TF2 has sufficient strength to be delivered to the reception device, and thus SR communication with the reception device may be performed effectively. As discussed above, in conventional OBSS environments, the probability of collision is high resulting in hidden node and exposed node challenges. However, in example embodiments, the hidden node and exposed node challenges are reduced or mitigated through the use of SR communication. Additionally, in example embodiments, through the operations discussed in association with FIGS. 3-6, test signals are used to determine an optimized or improved transmission factor that is relatively weak with respect to OBSS data in the channel but sufficiently strong to perform SR communication effectively. By using the optimized or improved transmission factor, the probability of collision with the OBSS data is reduced or mitigated, thereby improving the throughput and reliability of the OBSS environment.

A method of finding an optimal or an improved transmission factor (e.g., TF2) by outputting the two test signals Sig_t1 and Sig_t2 is shown in FIG. 4, but this is merely an example. The technical idea of the inventive concepts may be applied even when an optimal or improved transmission factor is found by outputting more or less than two test signals.

Also, in FIG. 4, an example embodiment in which when an acknowledgement signal corresponding to a test signal (e.g., Sig_t2) is received, a transmission factor (e.g., TF2) corresponding to the test signal is determined as a transmission factor of the SR data Data_SR is described, but the technical idea of the inventive concepts may also be applied to the case of outputting an additional test signal to find an optimal or improved transmission factor even after receiving the acknowledgment signal. That is, for example, even when the acknowledgment signal ACK corresponding to the second test signal Sig_t2 having the second transmission factor TF2 is received, the second AP 2 may output a third test signal having a third transmission factor weaker than the second transmission factor TF2. When receiving an acknowledgment signal corresponding to the third test signal, the second AP AP2 may transmit the SR data Data_SR using the third transmission factor.

Figure 5:
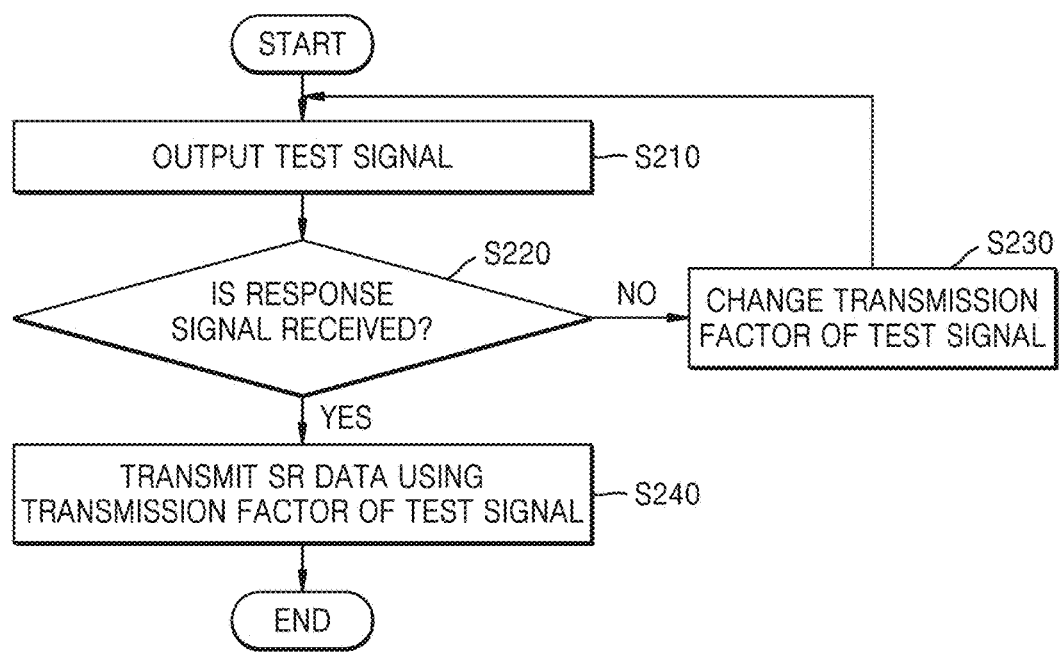
FIG. 5 is a flowchart for illustrating a data communication method for adaptively determining a transmission factor using a test signal according to an example embodiment of the inventive concepts.

FIG. 5 is a diagram illustrating an operation of the communication device 100 according to an example embodiment of the inventive concepts. In detail, FIG. 5 shows an operation of the communication device 100 for adaptively determining a transmission factor through a test signal.

Referring to FIGS. 2 and 5, the communication device 100 may output the test signal (S210). The communication device 100 may determine whether a response signal corresponding to the test signal is received (S220). When the response signal is not received (No at S220), the communication device 100 may change the transmission factor of the test signal (S230). The communication device 100 may then output the test signal having the changed transmission factor again (S210). When the response signal is received (Yes at S220), the communication device 100 may output SR data using the transmission factor of the test signal (S240).

Figures 6, 7:
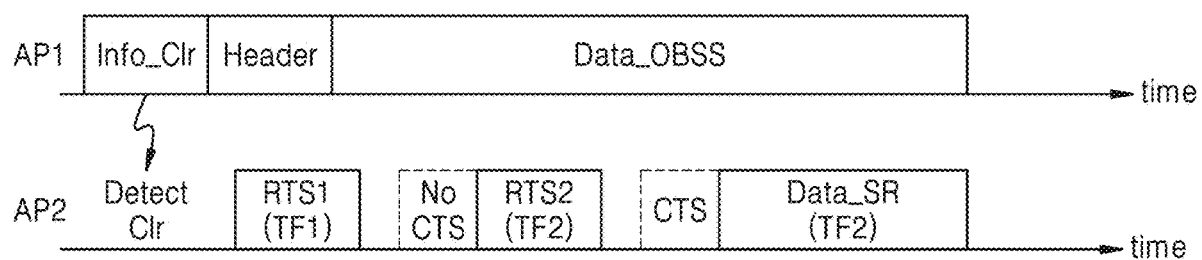
FIG. 6 is a table illustrating transmission factors according to an example embodiment of the inventive concepts.
FIG. 7 is a diagram illustrating an operation of a communication device for adaptively determining a transmission factor using a request-to-send signal according to an example embodiment of the inventive concepts.

FIG. 6 is a table illustrating transmission factors TF1 to TF4 according to an example embodiment of the inventive concepts.

Referring to FIGS. 2 and 6, the transmission factors TF1 to TF4 may include transmission power Tx Power and the number of bits per symbol BPS. The first transmission factor TF1 may include a first transmission power P1 and a first bit number n. The second transmission factor TF2 may include a second transmission power P2 and a second bit number n2. The third transmission factor TF3 may include a third transmission power P3 and a third bit number n3. The fourth transmission factor TF4 may include a fourth transmission power P4 and a fourth bit number n4. The first to fourth transmission factors TF1 to TF4 may be successively stronger transmission factors. That is, the first to fourth transmission powers P1 to P4 may have successively higher strength in order, and the first bit number n1 to the fourth bit number n4 may be successively smaller bit numbers in order.

In an example, the communication device 100 may output a first test signal using the first transmission factor TF1. When an acknowledgment signal corresponding to the first test signal is not received, the communication device 100 may output a second test signal using the second transmission factor TF2 which is stronger than the first transmission factor TF1. When an acknowledgment signal corresponding to the second test signal is not received, the communication device 100 may output a third test signal using the third transmission factor TF3 that is stronger than the second transmission factor TF2. When an acknowledgment signal corresponding to the third test signal is not received, the communication device 100 may output a fourth test signal using the fourth transmission factor TF4 which is stronger than the third transmission factor TF3. When receiving the acknowledgment signal corresponding to the fourth test signal, the communication device 100 may transmit SR data using the fourth transmission factor TF4.

In another example, the communication device 100 may output the first test signal using the first transmission factor TF1. When the acknowledgment signal corresponding to the first test signal is not received, the communication device 100 may output the fourth test signal using the fourth transmission factor TF4 which is stronger than the first transmission factor TF1. When receiving the acknowledgment signal corresponding to the fourth test signal, the communication device 100 may output the second test signal using the second transmission factor TF2 which is weaker than the fourth transmission factor TF4. When the acknowledgment signal corresponding to the second test signal is not received, the communication device 100 may output the third test signal using the third transmission factor TF3 that is stronger than the second transmission factor TF2. When receiving the acknowledgment signal corresponding to the third test signal, the communication device 100 may transmit the SR data using the third transmission factor TF3.

FIG. 7 is a diagram illustrating an operation of a communication device according to an example embodiment of the inventive concepts. In detail, FIG. 7 shows an example embodiment in which a request-to-send signal RTS is output instead of a test signal. Redundant descriptions between FIG. 7 and FIGS. 4 to 6 will be omitted.

The communication device may prevent or reduce the probability of a collision in an OBSS situation by using the request-to-send signal RTS and a clear-to-send signal CTS. That is, when an AP which is to transmit data may transmit the request-to-send signal RTS to a station that receives data, the station may transmit the request-to-send signal RTS to terminals nearby, thereby notifying that the data is to be received.

Referring to FIG. 7, the second AP AP2 may receive color information Info_Clr of the OBSS data Data_OBSS from the first AP AP1 and recognize the color information Info_Clr to determine whether to perform SR communication. When it is determined to perform SR communication, the second AP AP2 may output a first request-to-send signal RTS1 having the first transmission factor TF1. When a clear-to-send signal corresponding to the first request-to-send signal RTS1 is not received (No CTS), the second AP AP2 may output a second request-to-send signal RTS2 having the second transmission factor TF2 different from the first transmission factor TF1. When receiving the clear-to-send signal CTS corresponding to the second request-to-send signal RTS2, the second AP AP2 may output the SR data Data_SR using the second transmission factor TF2.

Figure 8A:
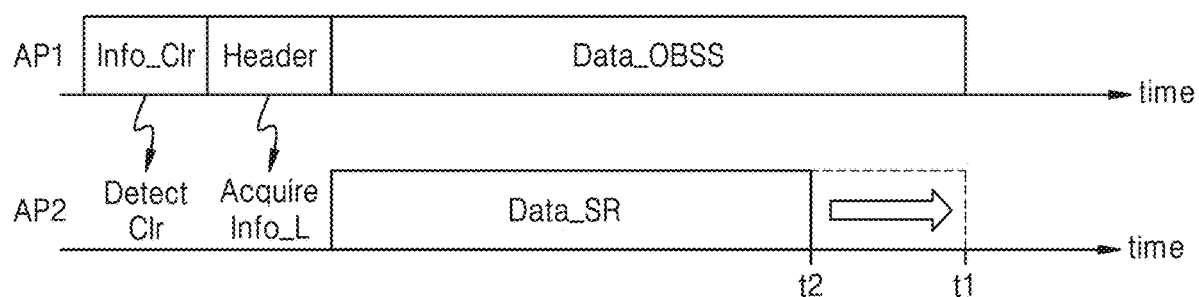
FIGS. 8A and 8B are diagrams illustrating an operation of a communication device for adjusting a transmission period of SR data according to an example embodiment of the inventive concepts.
Figure 8B:
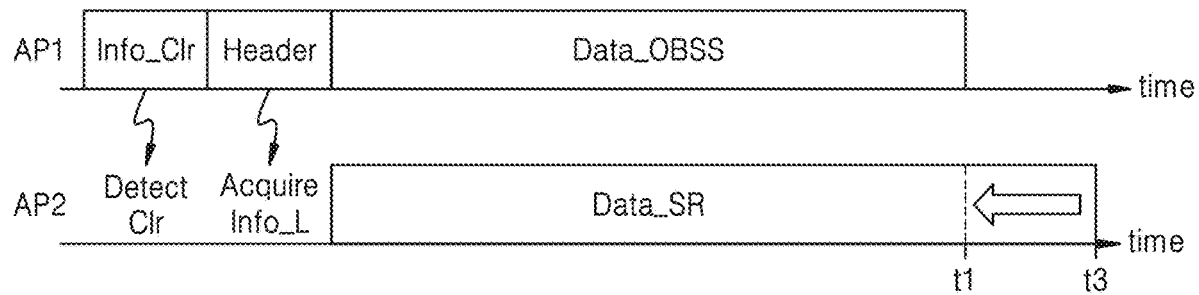

FIGS. 8A and 8B are diagrams illustrating an operation of a communication device according to an example embodiment of the inventive concepts. Specifically, FIGS. 8A and 8B show an example embodiment in which a transmission period of SR data is adjusted based on a transmission period of OBSS data.

Referring to FIGS. 8A and 8B, the second AP AP2 may receive the color information Info_Clr of the OBSS data Data_OBSS from the first AP AP1 and recognize the color information Info_Clr to determine whether to perform SR communication. When it is determined to perform SR communication, the second AP AP2 may receive a header of the OBSS data Data_OBSS and obtain (e.g. acquire) transmission period information Info_L of the OBSS data Data_OBSS from the header. Herein, the transmission period may indicate a time period in which frames for transmitting data are transmitted. Also, the transmission period information Info_L may include information about a time at which the transmission period of the OBSS data Data_OBSS ends.

The second AP AP2 may adjust an end time of the transmission period of the SR data Data_SR to a first time t1 which similar to or the same as an end time of the transmission period of the OBSS data Data_OBSS based on the transmission period information Info_L. In the example of FIG. 8A, the second AP AP2 may adjust the end time of the transmission period of the SR data Data_SR from a second time t2 to the first time t1 by increasing a number (e.g., quantity) of frames transmitted. In the example of FIG. 8B, the second AP AP2 may adjust the end time of the transmission period of the SR data Data_SR from a third time t3 to the first time t1 by reducing the number of frames transmitted.

The communication device (e.g., AP2) according to an example embodiment of the inventive concepts may allow the end time of the transmission period of the SR data Data_SR to be similar to or coincide with the end time of the transmission period of the OBSS data Data_OBSS, and thus transmission timing of SR communication and OBSS communication be similar or coincide. That is, as the end time of the transmission period matches, the communication device may not miss timing for color recognition Detect Clr for performing SR communication, and SR communication may be performed effectively. Without synchronizing the transmission period of the SR communication with that of the OBSS communication, the communication device 100 would either (i) recalculate a similar or the same transmission factor for OBSS communication (e.g., when the transmission period of the SR communication is shorter than that of the OBSS communication), thereby wasting resources (e.g., processor and/or energy resources), or (ii) the communication device 100 would use the transmission factor calculated for a particular OBSS communication for performing SR communication during a different OBSS communication (e.g., when the transmission period of the ST communication is longer than that of the OBSS communication), thereby increasing the probability of a collision and reducing the throughput and reliability of the OBSS environment. However, in example embodiments, as discussed in association with FIGS. 8A-11, the communication device 100 may synchronize the transmission period of the ST communication with that of the OBSS communication. In so doing, the communication device 100 conserves resources (e.g., processor and/or energy resources), reduces the probability of a collision and increases the throughput and reliability of the OBSS environment.

Figure 9:
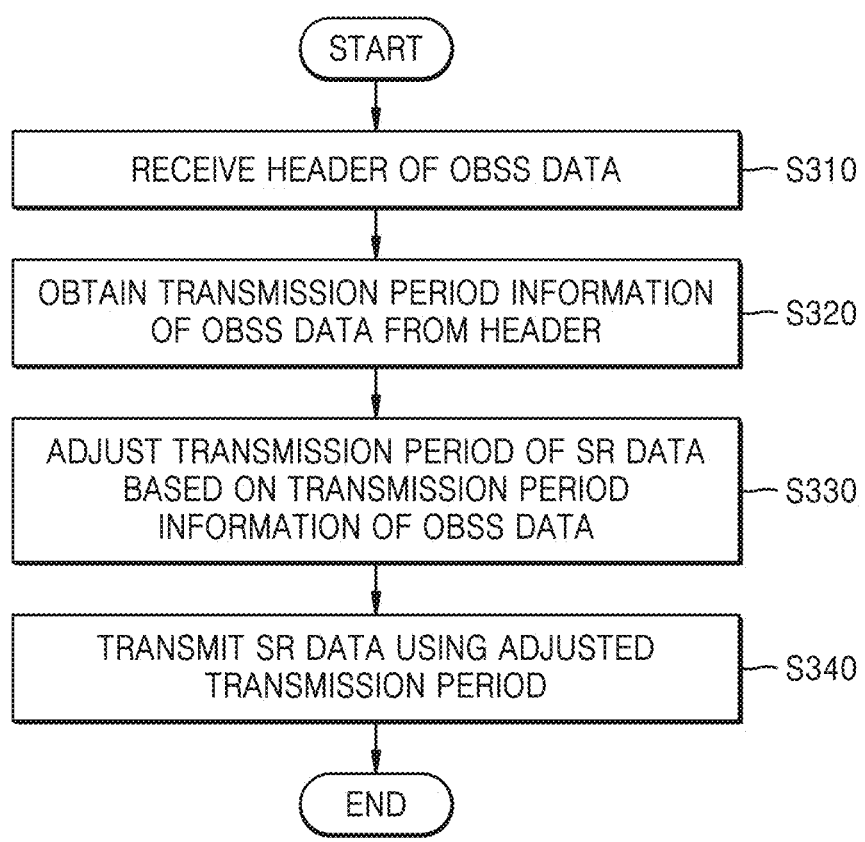
FIG. 9 is a flowchart illustrating a data communication method for adjusting a transmission period of SR data according to an example embodiment of the inventive concepts.

FIG. 9 is a flowchart illustrating a data communication method according to an example embodiment of the inventive concepts. More specifically, FIG. 9 shows an example embodiment in which a transmission period of SR data is adjusted based on a transmission period of OBSS data.

Referring to FIGS. 2 and 9, the communication device 100 may receive a header of the OBSS data (S310). The communication device 100 may obtain transmission period information of the OBSS data from the header (S320). The communication device 100 may adjust the transmission period of the SR data based on the transmission period information of the OBSS data (S330). The communication device 100 may transmit the SR data using the adjusted transmission period (S340).

Figure 10:
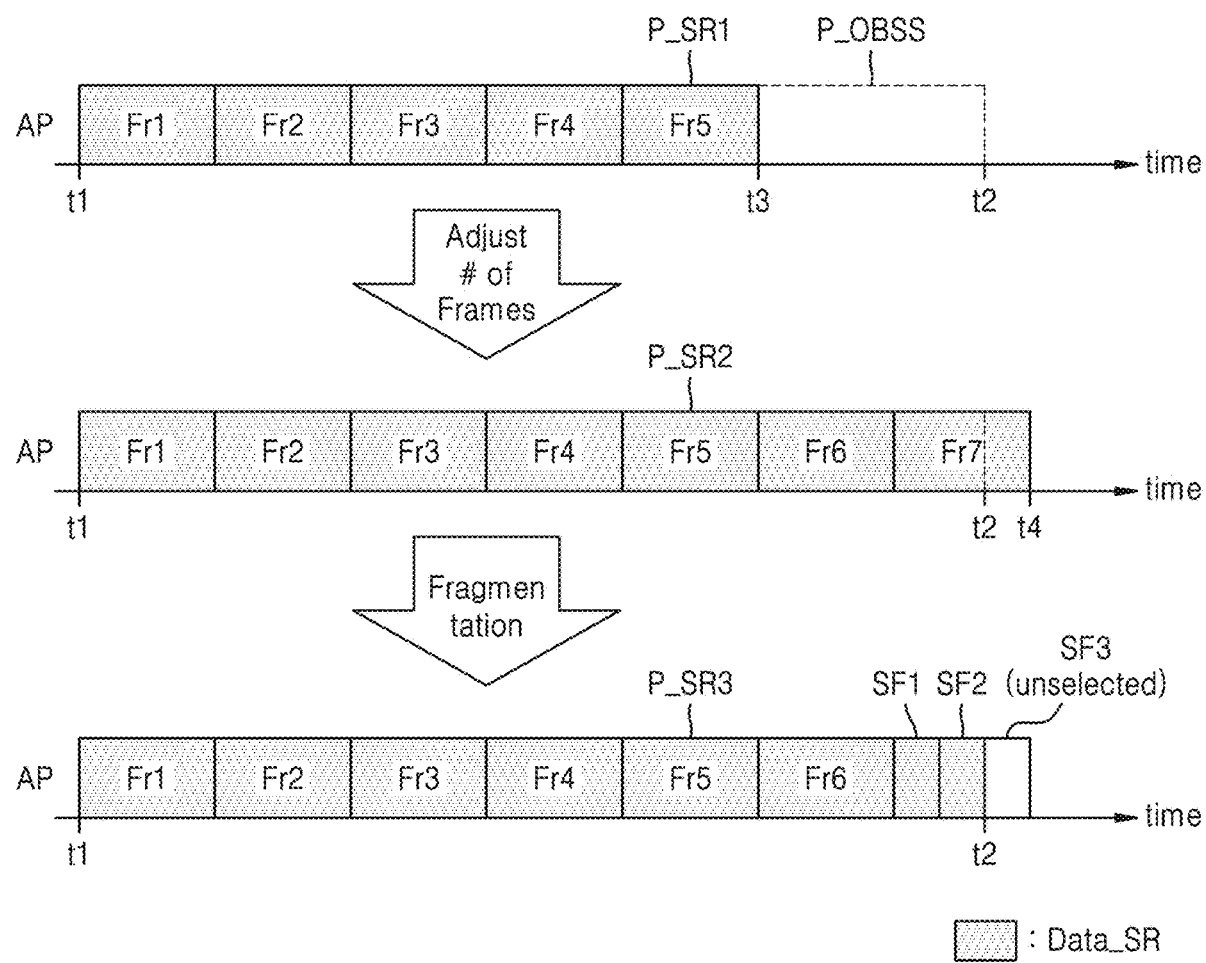
FIG. 10 is a diagram illustrating an operation of a communication device for adjusting a quantity of frames of SR data according to an example embodiment of the inventive concepts.

FIG. 10 is a diagram illustrating an operation of a communication device according to an example embodiment of the inventive concepts. Specifically, FIG. 10 shows an example embodiment in which a transmission period of the SR data Data_SR is adjusted by adjusting the number of frames based on a transmission period of OBSS data.

For convenience of explanation, an SR transmission period may mean the transmission period of the SR data, and an OBSS transmission period may mean the transmission period of the OBSS data. Referring to FIG. 10, a first SR transmission period P_SR1 may include a first frame Fr1 to a fifth frame Fr5. Based on the first SR transmission period P_SR1, an AP may transmit SR data Data_SR during the first time t1 to the third time t3.

The AP may adjust the number of frames to allow an end time of the SR transmission period to be similar to or coincide with the second time t2 which is an end time of an OBSS transmission period P_OBSS. That is, the AP may generate a second SR transmission period P_SR2 including the first frame Fr1 through a seventh frame Fr7 by adding two frames. Based on the second SR transmission period P_SR2, the AP may transmit the SR data Data_SR during the first time t1 to the fourth time t4.

Since the fourth time t4 which is an end time of the second SR transmission period P_SR2 is not similar to or does not coincide with the second time t2 which is the end time of the OBSS transmission period P_OBSS, the AP may perform fragmentation on the seventh frame Fr7 that is a last frame. The AP may generate a first subframe SF1 to a third subframe SF3 by dividing the seventh frame Fr7 and generate a third SR transmission period P_SR3 by selecting the first subframe SF1 and the second subframe SF2. Based on the third SR transmission period P_SR3, the AP may transmit the SR data Data_SR during the first time t1 to the second time t2, and thus timing of the SR transmission period P_SR3 and the OBSS transmission period P_OBSS may be similar or coincide.

Figure 11:
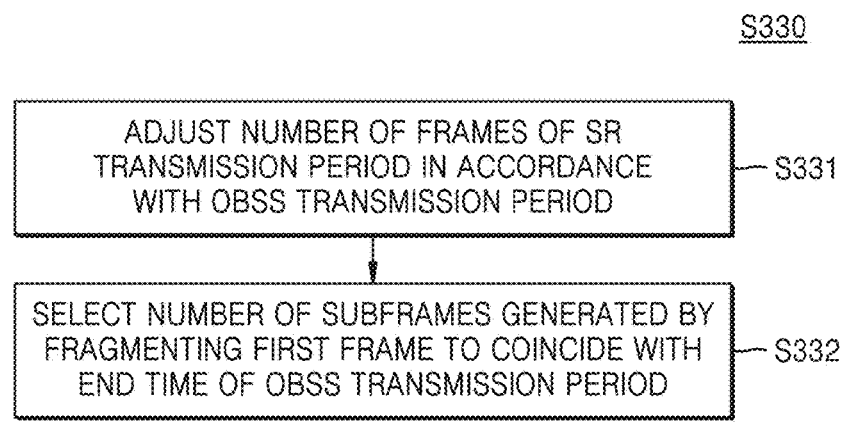
FIG. 11 is a flowchart illustrating a data communication method for adjusting a quantity of frames of SR data according to an example embodiment of the inventive concepts.

FIG. 11 is a flowchart illustrating a data communication method according to an example embodiment of the inventive concepts. Specifically, FIG. 11 shows an operation (S330) of adjusting a transmission period of SR data based on a transmission period of OBSS data by adjusting a number of frames of SR data of FIG. 9.

Referring to FIGS. 2 and 11, the communication device 100 may adjust the number of frames of an SR transmission period in accordance with an OBSS transmission period (S331). In an example embodiment, the communication device 100 may increase or decrease the number of frames in the SR transmission period based on an end time of the OBSS transmission period. The communication device 100 may select the number of subframes generated by fragmenting a first frame among frames of the SR transmission period to be similar to or coincide with the end time of the OBSS transmission period (S332). In an example embodiment, the first frame may be a last frame with respect to transmission time among the frames of the SR transmission period.

Figure 12:
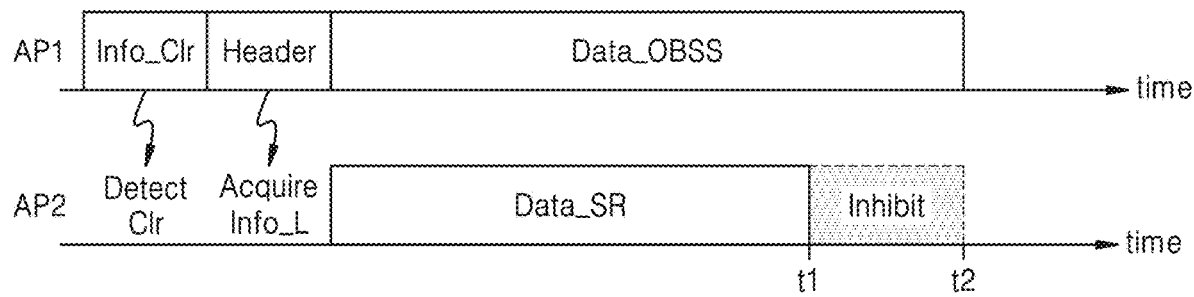
FIG. 12 is a diagram illustrating an operation of a communication device for adjusting an inhibit period according to an example embodiment of the inventive concepts.

FIG. 12 is a diagram illustrating an operation of a communication device according to an example embodiment of the inventive concepts. Specifically, FIG. 12 shows an example embodiment in which an inhibit period is adjusted based on a transmission period of OBSS data Data_OBSS. Redundant descriptions between FIG. 12 and FIGS. 8A and 8B will be omitted.

Referring to FIG. 12, the second AP AP2 may receive the color information Info_Clr of the OBSS data Data_OBSS from the first AP AP1 and recognize the color information Info_Clr to determine whether to perform SR communication. When it is determined to perform SR communication, the second AP AP2 may receive a header of the OBSS data Data_OBSS and obtain the transmission period information Info_L of the OBSS data Data_OBSS from the header.

The second AP AP2 may determine the inhibit period based on the transmission period information Info_L. In an example embodiment, the second AP AP2 may determine a period from the first time t1 which is an end time of an SR transmission period to the second time t2 which is an end time of an OBSS transmission period as the inhibit period. The second AP AP2 may not perform SR communication during the inhibit period. Accordingly, the timing of the OBSS communication of the first AP AP1 and the SR communication of the second AP AP2 may be similar or coincide. Accordingly, as discussed in association with FIGS. 8A-11, the communication device 100 conserves resources (e.g., processor and/or energy resources), reduces the probability of a collision and increases the throughput and reliability of the OBSS environment.

Figure 13:
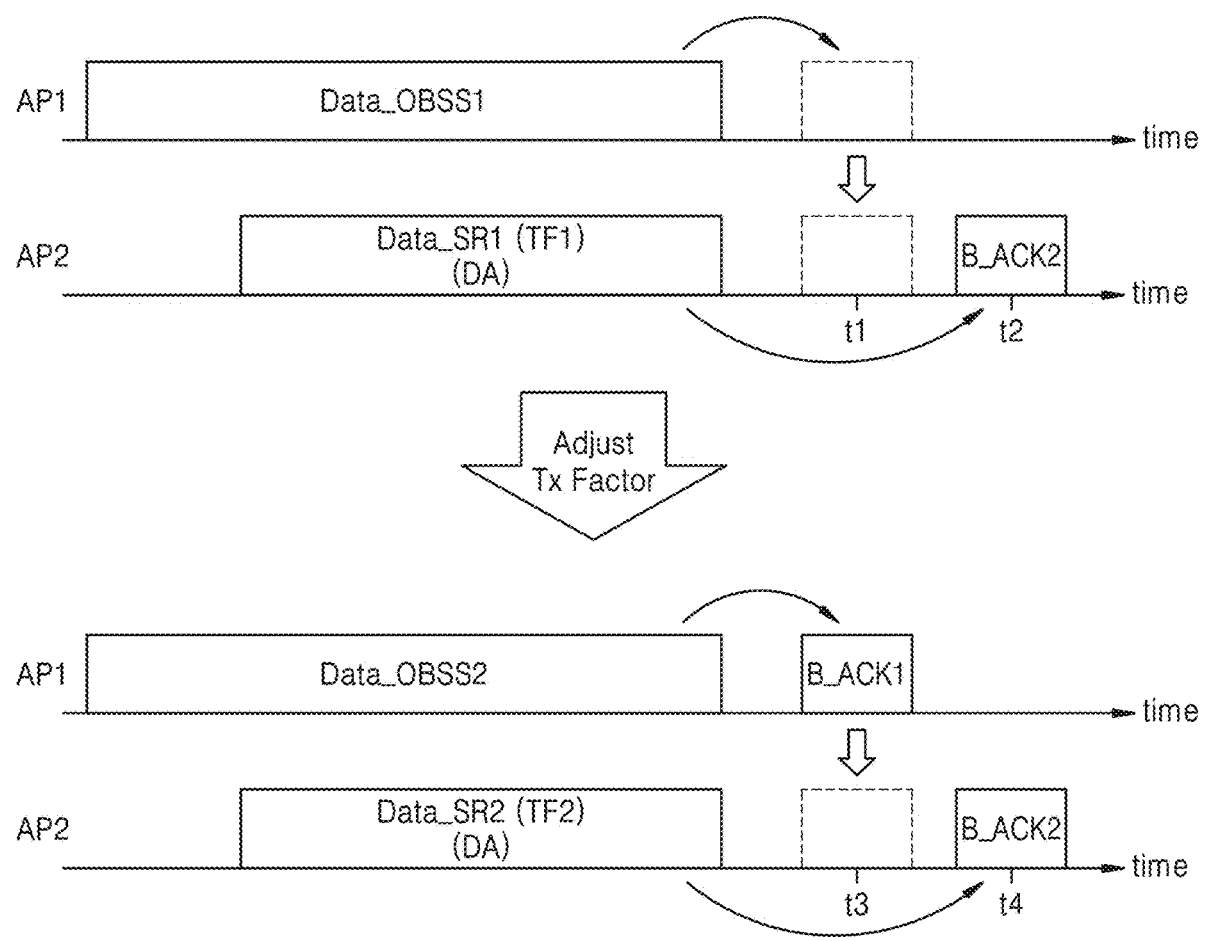
FIG. 13 is a diagram illustrating an operation of a communication device for adaptively determining a transmission factor using a delayed acknowledgement policy signal according to an example embodiment of the inventive concepts.

FIG. 13 is a diagram illustrating an operation of a communication device according to an example embodiment of the inventive concepts. In detail, FIG. 13 shows an operation performed by the communication device for adaptively determining a transmission factor through a delayed acknowledgement policy signal DA.

Referring to FIG. 13, while the first AP AP1 outputs first OBSS data Data_OBSS1, the second AP AP2 may transmit first SR data Data_SR1 including the delayed acknowledgement policy signal DA using the first transmission factor TF1. A reception device may output a block acknowledgement signal in response to SR data Data_SR1, SR Data Data_SR2, OBSS data Data_OBSS1 and/or OBSS data Data_OBSS2. In the present specification, the delayed acknowledgment policy signal DA may mean a signal that is included in data output from a transmission device such that the reception device may output the block acknowledgment signal at a time delayed by a certain period of time from a determined time (e.g., the delayed acknowledgement policy signal DA may request the reception device to output the block acknowledgement signal at the time delayed by the certain period of time from the determined time, such as at a time that is a particular period from the end of the SR data Data_SR1 transmission).

Based on the delayed acknowledgment policy signal DA, the second AP 2 may receive a second block acknowledgement signal B_ACK2 responding to the first SR data Data_SR1 at the second time t2 other than the determined first time t1 and may determine whether a first block acknowledgment signal B_ACK1 is received corresponding to the first OBSS data Data_OBSS1 from a reception device that has received the first OBSS data Data_OBSS1 at the first time t1.

When the second AP AP2 fails to receive the first block acknowledgment signal B_ACK1, the second AP AP2 may adjust a transmission factor for the SR data. In an example embodiment, the second AP AP2 may adjust the transmission factor for the SR data to be weaker than the previously use transmission factor. For example, the second AP AP2 may transmit the SR data DATA_SR2 using a lower transmission power than was used to transmit the SR data DATA_SR1.

The second AP AP2 may transmit the second SR data Data_SR2 including the delayed acknowledgement policy signal DA using the second transmission factor TF2 while the second OBSS data Data_OBSS2 is output. Based on the delayed acknowledgment policy signal DA, the second AP AP2 may receive the second block acknowledgement signal B_ACK2 responding to the second SR data Data_SR2 at the second time t2 other than the determined first time t1 and may determine whether the first block acknowledgment signal B_ACK1 is received corresponding to the second OBSS data Data_OBSS2, from a reception device that has received the second OBSS data Data_OBSS2, at the first time t1.

When the second AP AP2 receives the first block acknowledgment signal B_ACK1, the second AP AP2 may then determine the optimized or improved transmission factor for the SR data to be the second transmission factor TF2. That is, in a subsequent SR communication, the second AP AP2 may perform SR communication using the second transmission factor TF2.

When the transmission factor used by the second AP AP2 to transmit the SR data is too strong, the OBSS data of the first AP AP1 may not be transmitted to the reception device (e.g., STA1 of FIG. 1) effectively. According to an example embodiment of the inventive concepts, when the second AP AP2 fails to receive the block acknowledgement signal corresponding to the OBSS data due to the OBSS data not being transmitted to the reception device effectively, the second AP AP2 may adjust the transmission factor for the SR data to be weaker. Accordingly, the first AP AP1 may perform OBSS communication with the reception device effectively. Accordingly, as discussed in association with FIGS. 3-6, by using the optimized or improved transmission factor, the probability of collision with the OBSS data is reduced or mitigated, thereby improving the throughput and reliability of the OBSS environment.

Figure 14:
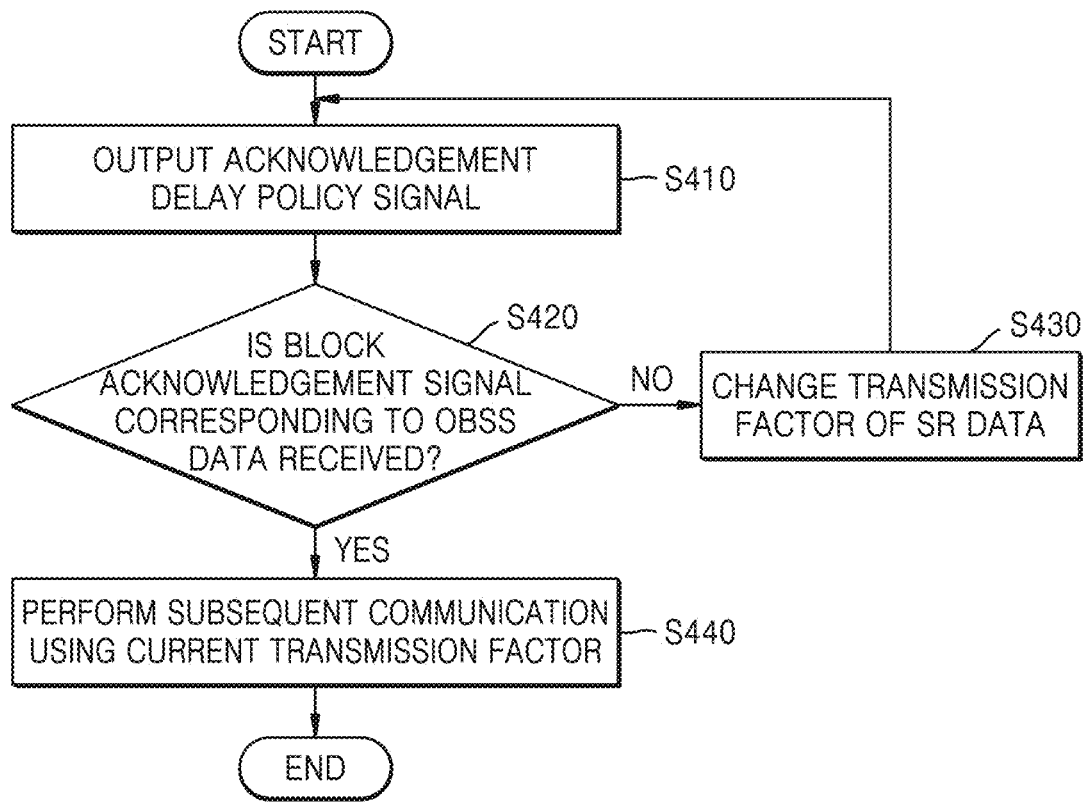
FIG. 14 is a flowchart illustrating a data communication method for adaptively determining a transmission factor using a delayed acknowledgement policy signal according to an example embodiment of the inventive concepts.

FIG. 14 is a flowchart illustrating a data communication method for adaptively determining a transmission factor using a delayed acknowledgement policy signal according to an example embodiment of the inventive concepts.

Referring to FIGS. 2 and 14, the communication device 100 may output an acknowledgement delay policy signal together with SR data (S410), and may determine whether a block acknowledgement signal is received corresponding to OBSS data (S420). When the block acknowledgment signal is not received, the communication device 100 may change a transmission factor of the SR data (S430), and repeat operations S410 and S420. When block acknowledgment signal is received, the communication device 100 may perform subsequent SR communication using the current transmission factor (S440).

Figure 15:
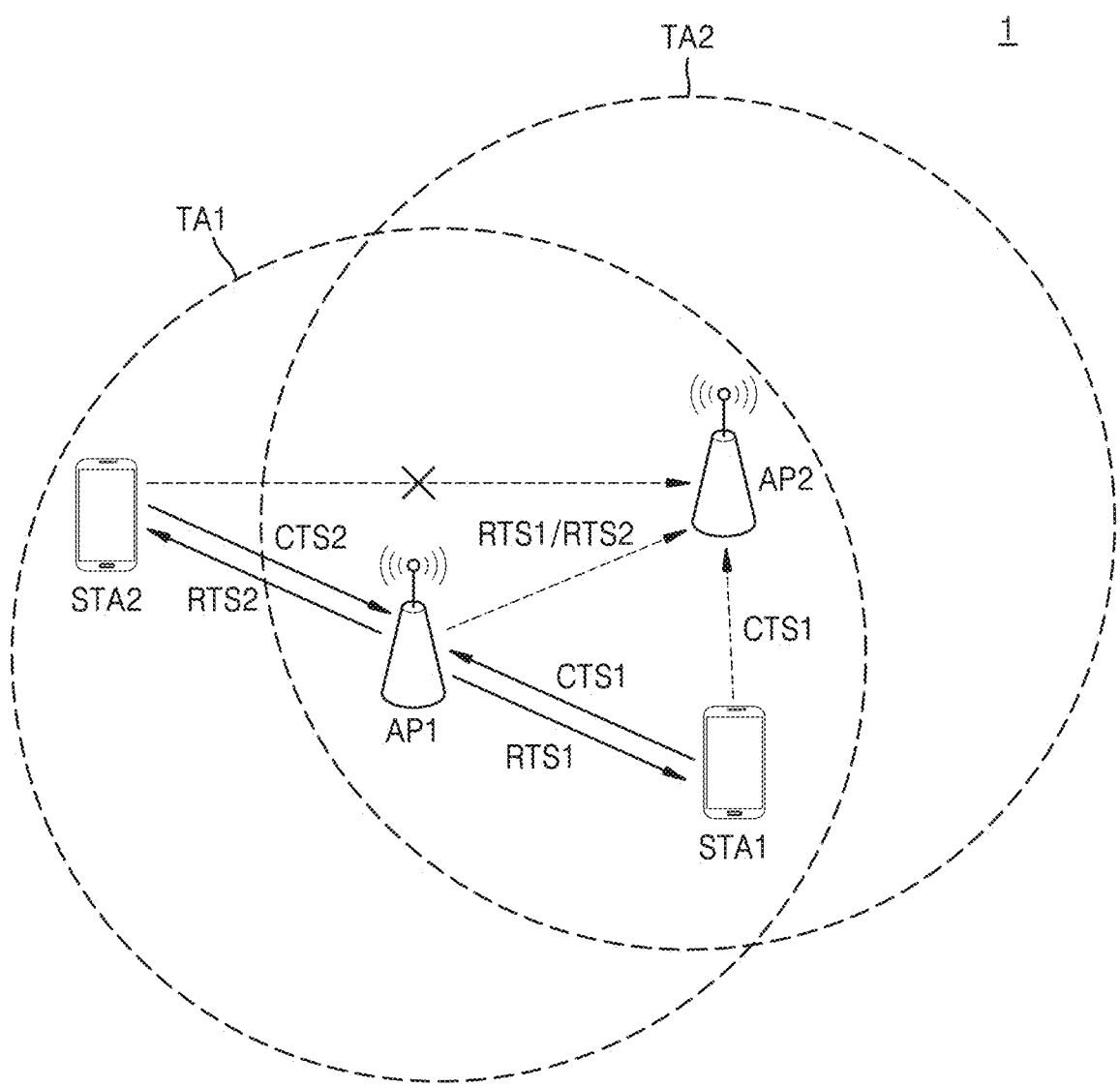
FIG. 15 is a diagram illustrating a wireless communication system for adaptively determining a transmission factor using a clear-to-send signal according to an example embodiment of the inventive concepts.

FIG. 15 is a diagram illustrating a wireless communication system 1 according to an example embodiment of the inventive concepts. Specifically, FIG. 15 is a diagram for explaining a condition for a communication device to perform an operation of adaptively determining a transmission factor through a block acknowledgment signal described in FIGS. 13 and 14. Redundant descriptions between FIG. 15 and FIGS. 1 and 13 will be omitted.

Referring to FIG. 15, the wireless communication system 1 may include the first AP AP1, the second AP AP2, the first station STA 1, and the second station STA 2. In FIG. 15, the first AP AP1 may perform OBSS communication with the first station STA1 and/or the second station STA2.

The first station STA1 may be included in both the first transmission area TA1 of the first AP AP1 and the second transmission area TA2 of the second AP AP2 whereas the second station STA2 may be included in the first transmission area TA1 of the first AP AP1 but may not be included in the second transmission area TA2 of the second AP AP2. The operation of adaptively determining the transmission factor through the block acknowledgment signal described in FIGS. 13 and 14 may be performed in a situation where the second AP AP2 may receive the block acknowledgment signal from the stations STA1 and STA2.

That is, in case of the first station STA1 included in an area where communication with the second AP AP2 is possible since it is included in the second transmission area TA2, the second AP AP2 may receive the block acknowledgment signal from the first station STA1, whereas in case of the second station STA2 that is not included in the area where communication with the second AP AP2 is possible since it is not included in the second transmission area TA2, the second AP AP2 may not receive the block acknowledgment signal from the second station STA2.

In an example embodiment of the inventive concepts, although the second AP AP2 is in a situation (e.g., with respect to STA1) capable of receiving the block acknowledgment signal from the station, since the second AP AP2 adjusts the transmission factor only when not receiving the block acknowledgement signal, the second AP AP2 may determine whether the stations STA1 and STA2 are included in the second transmission area TA2 of the second AP AP2.

In an example embodiment, the second AP AP2 may determine whether the stations STA1 and STA2 are included in the second transmission area TA2 based on the clear-to-send signal CTS of the stations STA1 and STA2.

In an example, the first AP AP1 may output the first request-to-send signal RTS1 to the first station STA1, and the second AP AP2 included in the first transmission area TA1 to meet a condition of SR communication may also receive the first request-to-send signal RTS1. The first station STA1 may output the first clear-to-send signal CTS1 in response to the first request-to-send signal RTS1 and is included in the second transmission area TA2, and thus the second AP AP2 may also receive the first clear-to-send signal CTS1. Since the second AP AP2 has received the first clear-to-send signal CTS1 from the first station STA1, the first station STA1 may be determined to be included in the second transmission area TA2 and may perform a transmission factor adjustment method described above in FIGS. 13 and 14.

In another example, the first AP AP1 may output the second request-to-send signal RTS2 to the second station STA2, and the second AP AP2 included in the first transmission area may also receive the second request-to-send signal RTS2. The second station STA2 may output the second clear-to-send signal CTS2 in response to the second request-to-send signal RTS2 and is not included in the second transmission area TA2, and thus the second station STA2 may not receive the second clear-to-send signal CTS2. Since the second AP 2 has not received the second clear-to-send signal CTS2 corresponding to the second request-to-send signal RTS2, the first station STA1 may be determined not to be included in the second transmittable area TA2 and may not perform the transmission factor adjustment method described above in FIGS. 13 and 14.

In an example embodiment, the second AP AP2 may determine whether the stations STA1 and STA2 are included in the second transmission area TA2 based on the block acknowledgment signal of the stations STA1 and STA2. When the second AP AP2 receives the block acknowledgment signal from the stations STA1 and STA2 within a determined time, the second AP AP2 may determine that the stations STA1 and STA2 are included in the second transmission area TA2 and may perform the transmission factor adjustment method described above in FIGS. 13 and 14.

Figure 16:
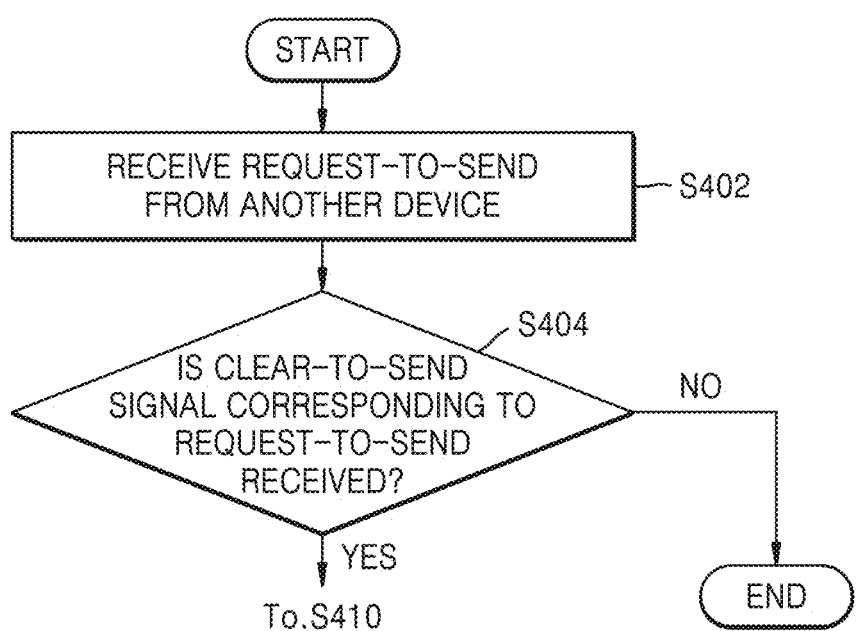
FIG. 16 is a flowchart illustrating a data communication method for adaptively determining a transmission factor using a clear-to-send signal according to an example embodiment of the inventive concepts.

FIG. 16 is a flowchart illustrating a data communication method according to an example embodiment of the inventive concepts. More specifically, FIG. 16 is a diagram for explaining an operation previous to an operation (S410) of outputting a delayed acknowledgement policy signal of FIG. 14.

Referring to FIGS. 2 and 16, the communication device 100 may receive the request-to-send signal RTS from another device (e.g., AP1 in FIG. 15) (S402). The communication device 100 may determine whether the clear-to-send signal CTS corresponding to the request-to-send signal RTS is received (S404). When the clear-to-send signal CTS is received, the communication device 100 may perform a method of adjusting a transmission factor (S410 to S440) using a delayed acknowledgment policy signal described in FIG. 14. Also, when the clear-to-send signal CTS is not received, the communication device 100 may not perform the method of adjusting a transmission factor (S410 to S440) using a delayed acknowledgment policy signal described in FIG. 14.

Figure 17:
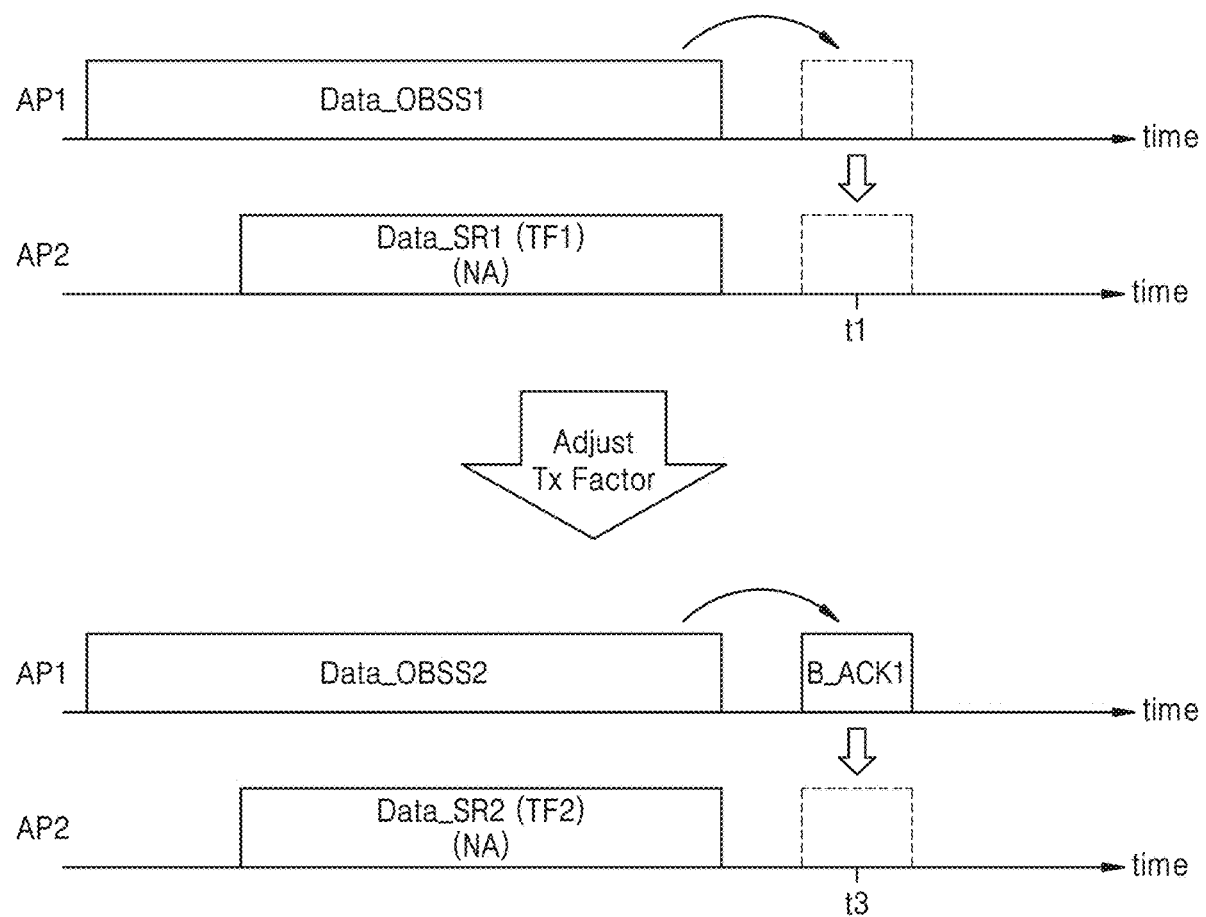
FIG. 17 is a diagram illustrating an operation of a communication device for adaptively determining a transmission factor using a no acknowledgement policy signal according to an example embodiment of the inventive concepts.

FIG. 17 is a diagram illustrating an operation of a communication device according to an example embodiment of the inventive concepts. In detail, FIG. 17 shows an operation performed by the communication device for adaptively determining a transmission factor through a no acknowledgement policy signal NA. Redundant descriptions between FIGS. 17 and 13 are omitted.

Referring to FIG. 17, the second AP AP2 may transmit the first SR data Data_SR1 including the no acknowledgment policy signal NA using the first transmission factor TF1 while the first AP AP1 outputs the first OBSS data Data_OBSS1. In the present specification, the no acknowledgment policy signal NA may mean a signal included in data output from a transmission device such that a reception device does not output the block acknowledgment signal.

Based on the no acknowledgment policy signal NA, the second AP AP2 may not receive the block acknowledgment signal corresponding to the SR data Data_SR1 and/or Data_SR2, and may determine whether the first block acknowledgment signal B_ACK1 corresponding to the first OBSS data Data_OBSS1 is received at the first time t1. The operation of FIG. 17 may be the same as or similar to that of FIG. 13 except that the block acknowledgment signal corresponding to the SR data Data_SR1 and Data_SR2 is not received, and thus a description thereof will be omitted.

Figure 18:
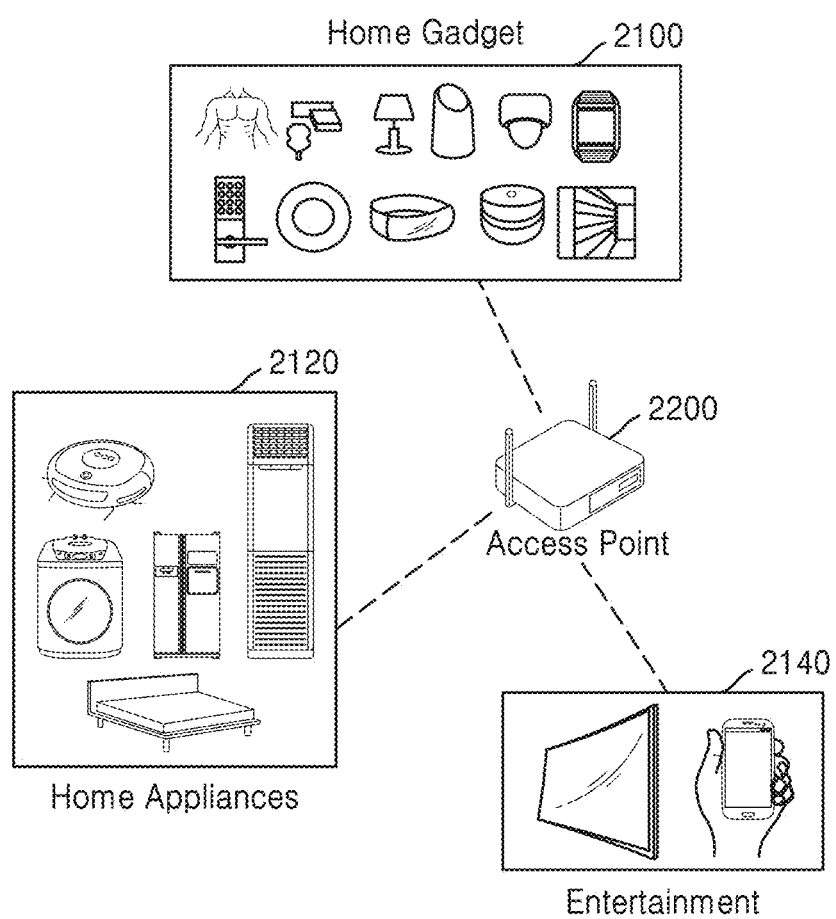
FIG. 18 is a diagram illustrating communication devices including a wireless communication device according to an example embodiment of the inventive concepts.

FIG. 18 is a diagram illustrating communication devices including a wireless communication device according to an example embodiment of the inventive concepts.

Referring to FIG. 18, a home gadget 2100, home appliances 2120, entertainment devices 2140, and an AP 2200 may include a communication device according to an example embodiment of the inventive concepts. In some example embodiments, the home gadget 2100, the home appliances 2120, the entertainment devices 2140, and the AP 2200 may be included in an Internet of Things (IoT) network system. It should be understood that the communication devices shown in FIG. 18 are only examples, and other communication devices not shown in FIG. 18 may include the wireless communication device according to an example embodiment of the inventive concepts. According to some example embodiments, operations described herein as being performed by any or all of the home gadget 2100, the home appliances 2120, the entertainment devices 2140, and the AP 2200 may be performed by at least one processor executing program code that includes instructions corresponding to the operations. The instructions may be stored in a memory of the home gadget 2100, the home appliances 2120, the entertainment devices 2140, and/or the AP 2200.

The home gadget 2100, the home appliances 2120, the entertainment devices 2140, and/or the AP 2200 may transmit and/or receive signals by means of a wireless communication device according to example embodiments of the inventive concepts.

According to an example embodiment of the inventive concepts, at least one of the home gadget 2100, the home appliances 2120, the entertainment devices 2140, and/or the AP 2200 may adaptively determine an optimal or improved transmission factor using at least one test signal prior to performing SR communication and may perform SR communication using the determined transmission factor.

According to an example embodiment of the inventive concepts, at least one of the home gadget 2100, the home appliances 2120, the entertainment devices 2140, and/or the AP 2200 may determine a transmission period of SR communication for transmitting SR data based on a transmission period of OBSS communication and perform SR communication using the determined transmission period.

According to an example embodiment of the inventive concepts, at least one of the home gadget 2100, the home appliances 2120, the entertainment devices 2140, and/or the AP 2200 may delay a block acknowledgment signal for SR data using an acknowledgment delay policy signal and adaptively determine a transmission factor according to whether a block acknowledgment signal for OBSS data is received.

Accordingly, SR communication and OBSS communication of the home gadget 2100, the home appliances 2120, the entertainment devices 2140, and/or the AP 2200 may be performed effectively.

The various operations of methods described above may be performed by any suitable device capable of performing the operations, such as various hardware and/or software implemented in some form of hardware (e.g., processor).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The inventive concepts have been particularly shown and described with reference to example embodiments thereof. The terminology used herein is for the purpose of describing example embodiments only and is not intended to be limiting of the inventive concepts. Thus, it will be understood that various changes in form and details may be made therein without departing from the spirit and scope of the inventive concepts as defined by the appended claims. While the inventive concepts has been particularly shown and described with reference to example embodiments thereof, it will be understood that various changes in form and details may be made therein without departing from the spirit and scope of the following claims.

What is claimed is:

1. A wireless communication device comprising:
   a memory storing computer-readable instructions; and
   at least one processor configured to execute the computer-readable instructions to
      transmit a plurality of test signals generated based on different transmission factors to a reception device, and
      transmit first data to the reception device based on a transmission factor of a first test signal among the plurality of test signals in response to determining a first acknowledgement signal has been received, the first acknowledgement signal corresponding to the first test signal, the transmission of the first data being via a wireless data channel while second data is contemporaneously transmitted via the wireless data channel by another device, and the transmission of the first data includes adjusting a first transmission period of the first data such that the first transmission period terminates at a time at which a second transmission period of the second data terminates.

2. The wireless communication device of claim 1, wherein the transmission factor comprises at least one of a transmission power level or a quantity of bits per symbol.

3. The wireless communication device of claim 1, wherein the second transmission period is acquired from a header of the second data.

4. The wireless communication device of claim 3, wherein the at least one processor is configured to execute the computer-readable instructions to adjust the first transmission period by adjusting a quantity of frames constituting the first data based on the second transmission period.

5. The wireless communication device of claim 1, wherein the at least one processor is configured to execute the computer-readable instructions to transmit a delayed acknowledgement policy signal corresponding to the first data to the reception device.

6. The wireless communication device of claim 1, wherein the at least one processor is configured to execute the computer-readable instructions to determine whether a block acknowledgment signal corresponding to the second data has been received, and transmit third data at a transmission power level lower than a transmission power level at which the first data is transmitted in response to determining the block acknowledgment signal corresponding to the second data has not been received.

7. A data communication method of transmitting first data using spatial reuse (SR) in which the first data is transmitted via a wireless data channel while second data is contemporaneously transmitted via the wireless data channel by another device, the data communication method comprising:
   transmitting a first test signal having a first transmission factor;
   transmitting a second test signal in response to determining an acknowledgement signal corresponding to the first test signal has not been received, the second test signal having a second transmission factor different from the first transmission factor; and
   transmitting the first data using the second transmission factor in response to determining an acknowledgment signal corresponding to the second test signal has been received, the transmitting the first data includes adjusting a first transmission period of the first data such that the first transmission period terminates at a time at which a second transmission period of the second data terminates.

8. The data communication method of claim 7, wherein the first transmission factor and the second transmission factor comprise at least one of a transmission power level or a quantity of bits per symbol.

9. The data communication method of claim 8, wherein the first test signal is transmitted using a first transmission power level and a first quantity of bits per symbol, the second test signal is transmitted using a second transmission power level and a second quantity of bits per symbol, the second transmission power level is greater than the first transmission power level, and the second quantity of bits per symbol is lower than the first quantity of bits per symbol.

10. The data communication method of claim 7, further comprising:
    obtaining color information from the second data; and
    determining whether to transmit the first data using SR based on the color information.

11. The data communication method of claim 10, wherein the determining whether to transmit the first data using SR comprises:
    determining whether a basic service set (BSS) of the second data is different from a BSS of the first data based on the color information; and
    determining to transmit the first data using SR in response to determining the BSS of the second data is different from the BSS of the first data.

12. The data communication method of claim 7, further comprising:
    obtaining the second transmission period of the second data from a header of the second data.

13. The data communication method of claim 7, wherein the first data comprises a plurality of frames, and the adjusting the first transmission period comprises adjusting a quantity of the plurality of frames based on the second transmission period.

14. The data communication method of claim 13, wherein the adjusting the first transmission period comprises generating a plurality of subframes by fragmenting a first frame among the plurality of frames, and the transmitting the first data includes transmitting at least one of the plurality of subframes.

15. The data communication method of claim 7, further comprising:

obtaining a second transmission period of the second data from a header of the second data; and determining a first inhibit period during which data transmission is not performed based on the second transmission period.

16. The data communication method of claim 7, further comprising transmitting a delayed acknowledgement policy signal corresponding to the first data.

17. The data communication method of claim 7, further comprising:

determining whether a block acknowledgment signal corresponding to the second data has been received; and transmitting third data using a third transmission factor in response to determining the block acknowledgment signal corresponding to the second data has not been received, the third transmission factor comprising a third transmission power level lower than a second transmission power level of the second transmission factor.

18. The data communication method of claim 17, wherein the determining whether the block acknowledgment signal has been received comprises:

receiving a request-to-send signal from the other device; and determining whether a clear-to-send signal corresponding to the request-to-send signal has been received, wherein the determining whether the block acknowledgment signal has been received is performed in response to the receiving the request-to-send signal.

19. A data communication method of transmitting first data using spatial reuse (SR) in which the first data is transmitted via a wireless data channel while second data is contemporaneously transmitted via the wireless data channel by another device, the first data corresponding to a first transmission period for transmitting the first data, the data communication method comprising:

obtaining a second transmission period of the second data from a header of the second data;

adjusting the first transmission period based on the second transmission period to generate an adjusted first transmission period; and transmitting the first data based on the adjusted first transmission period.

20. The data communication method of claim 19, wherein the adjusting the first transmission period comprises adjusting the first transmission period such that the first transmission period terminates at a time at which the second transmission period terminates.

* * * * *